UNITED STATES PATENT OFFICE.

WALTER T. SCHEELE, OF HACKENSACK, NEW JERSEY, ASSIGNOR TO THE GOVERNMENT OF THE UNITED STATES, REPRESENTED BY THE SECRETARY OF THE NAVY.

PROTECTIVE MIXTURE FOR HIGH EXPLOSIVES.

1,391,796.  Specification of Letters Patent.  Patented Sept. 27, 1921.

No Drawing.  Application filed December 9, 1919. Serial No. 343,574.

*To all whom it may concern:*

Be it known that I, WALTER T. SCHEELE, a citizen of Germany, and having made application for citizenship in the United States, and a resident of Hackensack, New Jersey, have invented new and useful Improvements in Protective Mixtures for High Explosives, of which the following is a specification.

The purpose of this invention is to find a medium that will practically make trinitrotoluol inert to explosions from outside percussion, self ignition or self combustion and altogether render the same safe to handle and safe to store away and yet not destroying its velocity of detonation. Further to prevent any formation of free nitrous acid which is the cause of most of the trinitrotoluol self explosions. In other words, to safeguard the trinitrotoluol and render the same, when handled under ordinary circumstances, absolutely non-dangerous.

Trinitrotoluol $C_6H_2CH_3(NO_2)_3$, or trinitrotoluol ordinary commercially called, should form, if in pure state, faint yellow crystals which darken when exposed to the rays of light and which have a melting point of 82°. At high temperature the crystals begin to volatilize and if suddenly heated to 240° ignition takes place. If trinitrotoluol is free from nitrous acid, it is very stable toward percussion, and can be kept melted or compressed without difficulty, but if trinitrotoluol by some outside causes is allowed to free some of its nitrogen in the form of nitrous acid it forms immediately a most dangerous material to handle, and is liable to explosion by the least percussion or ignition spontaneously.

Now, for the purpose of this invention, I have found a way to make the trinitrotoluol absolutely safe to handle, safe to melt and safe to keep.

As an example of my invention I give the following description thereby stating that if the trinitrotoluol is thus prepared in this precautionary manner, it will not lose, in any way, its velocity of detonation, and the characteristic decomposition reaction of the prepared trintrotoluol when detonated will be the same as with unprotected trinitrotoluol, namely, $2C_6H_2CH_3(NO_2)_3$ equal to $12CO+2CH_4+H_2+3N$.

Furthermore, it has been proven, that the trinitrotoluol thus prepared with the protective matter will furnish in the amount of one kilo trinitrotoluol 778 liters of gases, exactly the same amount as produced by the unprotected trinitrotoluol.

Now to demonstrate my invention I prepare a solution of 960 grams of carbon disulfid mixed with 20 grams of anilin $C_6H_5NH_2$ and 20 grams of pure vaseline. I have found that the application of carbon disulfid as a solvent in this case seems to be the most appropriate, as carbon disulfid only dissolves at a moderate temperature 0.39% of the trinitrotoluol and can be easily distilled by the application of moderate heat from the remaining anilin, vaseline and trinitrotoluol mixture.

In order to mix the carbon disulfid anilin vaseline solution with the trinitrotoluol I add the same slowly to the trinitrotoluol and under constant stirring I continue to add such mixture until all particles of the trinitrotoluol have been moistened with the mixture. Anilin $C_6H_5NH_2$ has a characteristic to form with the trinitrotoluol a double composition product or double salts, namely, $C_6H_2CH_3(NO_2)_3+C_6H_5NH_2$. Without thus changing the velocity of detonation the presence of the anilin in connection with the trinitrotoluol as a double salt will make the trinitrotoluol inert from any formations of nitrous acid gas and thus eliminate all danger of self explosion by percussion, etc., or self ignition.

I do not confine myself to the ordinary trinitrotoluol or the alpha, beta or gamma trinitrotoluol. I also may apply this to other trinitrotuol combinations well-known in the art of manufacture of explosives.

What I claim is:—

1. An article of manufacture, comprising a high explosive having incorporated therewith a solution containing anilin $C_6H_5(NH)_2$.

2. A protective composition for high explosives including anilin $C_6H_5NH_2$, a hydrocarbon, and carbon disulfid.

3. An article of manufacture, comprising a mixture of a high explosive having nitric acid as a base, and a solution containing 2% of anilin $C_6H_5NH_2$.

4. A protective composition for high explosives having nitric acid as a base, including 2% of anilin $C_6H_5NH_2$, 96% of carbon disulfid and 2% of hydrocarbon.

5. A protective mixture for high explosives having nitric acid as a base comprising carbon disulfid, anilin $C_6H_5NH_2$ and vaseline.

6. An article of manufacture, comprising a mixture of a high explosive, and a solution containing anilin and a hydrocarbon, thereby forming with the high explosive a double salt having the formula $C_6H_2CH_2(NO_2)_3 + C_6H_5(NH)_2$.

7. An article of manufacture, comprising a mixture of trinitrotoluol and a solution containing anilin $C_6H_5NH_2$.

Signed at Washington, District of Columbia, this 15th day of November, 1919.

DR. WALTER T. SCHEELE.